US012663908B2

(12) United States Patent
Li

(10) Patent No.: US 12,663,908 B2
(45) Date of Patent: Jun. 23, 2026

(54) METHOD AND APPARATUS OF SCREEN SAVER INTERACTION, ELECTRONIC DEVICE AND STORAGE MEDIUM

(71) Applicant: SHENZHEN TCL NEW TECHNOLOGY CO., LTD., Shenzhen (CN)

(72) Inventor: Ce Li, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 301 days.

(21) Appl. No.: 18/570,082

(22) PCT Filed: Jun. 7, 2022

(86) PCT No.: PCT/CN2022/097452
§ 371 (c)(1),
(2) Date: Dec. 14, 2023

(87) PCT Pub. No.: WO2022/262618
PCT Pub. Date: Dec. 22, 2022

(65) Prior Publication Data
US 2024/0295941 A1     Sep. 5, 2024

(30) Foreign Application Priority Data
Jun. 16, 2021     (CN) .......................... 202110664505.8

(51) Int. Cl.
*G06F 3/0481* (2022.01)
*G06F 3/01* (2006.01)

(52) U.S. Cl.
CPC ............ *G06F 3/0481* (2013.01); *G06F 3/011* (2013.01); *G06F 3/017* (2013.01)

(58) Field of Classification Search
CPC ......... G06F 3/0481; G06F 3/017; G06F 3/011
See application file for complete search history.

(56) References Cited

U.S. PATENT DOCUMENTS 6,111,580 A *   8/2000   Kazama .................. G06F 3/017
                                                            715/863
10,324,612 B2 *   6/2019   Kerr .................... G06F 3/04883
(Continued)

FOREIGN PATENT DOCUMENTS

CN     101872278 A     10/2010
CN     102402377 A     4/2012
(Continued)

OTHER PUBLICATIONS

International Search Report in International application No. PCT/CN2022/097452, mailed on Aug. 15, 2022.
(Continued)

*Primary Examiner* — Patrick F Riegler
(74) *Attorney, Agent, or Firm* — PV IP PC; Wei Te Chung

(57) ABSTRACT

Disclosed are a method and an apparatus of screen saver interaction, an electronic device, and a storage medium. In an embodiment, a screen saver interface may be displayed. Upon receiving the interaction trigger instruction from the interaction object for the screen saver content in the screen saver interface, target interaction information is obtained based on the interaction trigger instruction. A dynamic interaction effect for the screen saver content is determined based on the target interaction information. The dynamic interaction effect for the screen saver content is displayed on the screen saver interface to realize dynamic interaction between the interaction object and the screen saver content.

12 Claims, 7 Drawing Sheets

Interaction 1011     1012

(56) References Cited

U.S. PATENT DOCUMENTS

| | | | | |
|---|---|---|---|---|
| 10,372,191 | B2 * | 8/2019 | Valko | G06F 1/3231 |
| 2004/0041849 | A1 * | 3/2004 | Mock | G09G 5/00 |
| | | | | 715/867 |
| 2004/0049419 | A1 * | 3/2004 | Knight | G06Q 30/02 |
| | | | | 715/867 |
| 2004/0049533 | A1 * | 3/2004 | Knight | G06Q 10/00 |
| | | | | 715/867 |
| 2008/0134063 | A1 | 6/2008 | Volach | |
| 2009/0153389 | A1 * | 6/2009 | Kerr | G06F 3/04855 |
| | | | | 386/243 |
| 2009/0153475 | A1 * | 6/2009 | Kerr | H04N 21/42224 |
| | | | | 345/157 |
| 2009/0153478 | A1 * | 6/2009 | Kerr | H04N 5/445 |
| | | | | 345/184 |
| 2009/0158203 | A1 * | 6/2009 | Kerr | G06F 3/017 |
| | | | | 715/784 |
| 2009/0158222 | A1 * | 6/2009 | Kerr | G06F 3/0346 |
| | | | | 715/867 |
| 2010/0125819 | A1 | 5/2010 | Sudhakar | |
| 2011/0109538 | A1 * | 5/2011 | Kerr | G09G 5/36 |
| | | | | 715/765 |
| 2012/0151341 | A1 * | 6/2012 | Ko | G06Q 10/10 |
| | | | | 715/867 |
| 2015/0052488 | A1 * | 2/2015 | Rybchin | G06F 9/451 |
| | | | | 715/867 |
| 2015/0133199 | A1 * | 5/2015 | Lee | H04M 1/724634 |
| | | | | 455/566 |
| 2015/0296323 | A1 * | 10/2015 | Wu | G08B 21/182 |
| | | | | 455/414.1 |
| 2015/0370920 | A1 * | 12/2015 | Van Os | G06F 3/04842 |
| | | | | 715/810 |
| 2016/0006678 | A1 * | 1/2016 | Jung | G06F 3/04883 |
| | | | | 715/752 |
| 2016/0370982 | A1 * | 12/2016 | Penha | G06F 3/04847 |
| 2018/0210612 | A1 | 7/2018 | Lyubich et al. | |
| 2019/0369860 | A1 * | 12/2019 | Purevdorj | G09G 3/20 |
| 2022/0334633 | A1 * | 10/2022 | Li | G06F 3/012 |
| 2023/0017626 | A1 * | 1/2023 | Fu | H04N 21/4312 |
| 2023/0205296 | A1 * | 6/2023 | Hong | G06F 1/3228 |
| | | | | 713/320 |

FOREIGN PATENT DOCUMENTS

| | | | | | |
|---|---|---|---|---|---|
| CN | 103458288 | A | 12/2013 | | |
| CN | 105260182 | A | 1/2016 | | |
| CN | 106713982 | A | 5/2017 | | |
| CN | 107396187 | A | 11/2017 | | |
| CN | 108319329 | A | 7/2018 | | |
| CN | 108717369 | A | 10/2018 | | |
| CN | 109254716 | A | 1/2019 | | |
| CN | 110347244 | A | 10/2019 | | |
| CN | 110866133 | A | 3/2020 | | |
| CN | 111104196 | A | 5/2020 | | |
| CN | 111800544 | A | 10/2020 | | |
| CN | 111836115 | A | 10/2020 | | |
| CN | 306486705 | S | 4/2021 | | |
| CN | 112788390 | A | 5/2021 | | |
| CN | 113377198 | A | 9/2021 | | |
| JP | 2017534934 | A | 11/2017 | | |
| JP | 2021015637 | A | 2/2021 | | |
| WO | WO-2008025012 | A2 * | 2/2008 | | H04L 67/54 |
| WO | WO-2022041220 | A1 * | 3/2022 | | G06F 1/3203 |

OTHER PUBLICATIONS

Written Opinion of the International Search Authority in International application No. PCT/CN2022/097452, mailed on Aug. 15, 2022.

First Chinese Office Action issued in corresponding Chinese Patent Application No. 202110664505.8 dated Apr. 27, 2022, pp. 1-11.

Second Chinese Office Action issued in corresponding Chinese Patent Application No. 202110664505.8 dated Sep. 7, 2022, pp. 1-13.

Third Chinese Office Action issued in corresponding Chinese Patent Application No. 202110664505.8 dated Mar. 25, 2023, pp. 1-10.

Japanese Office Action issued in corresponding Japanese Patent Application No. 2023-577118 dated Dec. 3, 2024, pp. 1-3.

* cited by examiner

1011

Interaction

1012

Television

METHOD AND APPARATUS OF SCREEN SAVER INTERACTION, ELECTRONIC DEVICE AND STORAGE MEDIUM

CROSS REFERENCE TO RELATED APPLICATIONS

This application is a US national phase application based upon an International Application No. PCT/CN2022/097452, filed on Jun. 7, 2022, and this application claims priority to Chinese Patent Application No. 202110664505.8, filed on Jun. 16, 2021, entitled "METHOD AND APPARATUS OF SCREEN SAVER INTERACTION, ELECTRONIC DEVICE AND STORAGE MEDIUM". The entire disclosures of the above application are incorporated herein by reference.

TECHNICAL FIELD

The present application relates to a field of communication technologies, and more particularly, to a method and an apparatus of screen saver interaction, an electronic device, and a storage medium.

BACKGROUND

Screen saver is a special program designed to protect a display, and it may prevent a computer from displaying a same picture for a long time duration which the computer is not operated. The displaying of the same picture for a long time results in aging and shortening the lifespan of the display. In recent years, with the rapid development of Internet technology and television technology, application scenes and functions of television are gradually increasing. However, screen saver technology on television is still slow to develop, and the screen saver is used to provide only posters of television plays or movies, or to provide some preset animation effects, so that display and function of the screen saver are relatively simpler.

SUMMARY

Technical Problem

However, screen saver technology on television is still slow to develop, and the screen saver is used to provide only posters of television plays or movies, or to provide some preset animation effects, so that display and function of the screen saver are relatively simpler.

TECHNICAL SOLUTION FOR PROBLEM

Technical Solution

An embodiment of the present application provides a method and an apparatus of screen saver interaction, an electronic device, and a storage medium, which may implement dynamic interaction with screen savers.

An embodiment of the present application provides a screen saver interaction method, including:

displaying a screen saver interface;

upon receiving the interaction trigger instruction from an interaction object for screen saver content in the screen saver interface, obtaining target interaction information based on the interaction trigger instruction;

determining a dynamic interaction effect for the screen saver content based on the target interaction information; and displaying, on the screen saver interface, the dynamic interaction effect for the screen saver content to realize dynamic interaction between the interaction object and the screen saver content.

Accordingly, an embodiment of the present application further provides a screen saver interaction apparatus, including:

a first display unit configured to display a screen saver interface;

an obtaining unit configured to obtain target interaction information based on the interaction trigger instruction upon receiving the interaction trigger instruction from an interaction object for screen saver content in the screen saver interface, wherein the interaction information includes information generated when the interaction object interacts with the screen saver content in the screen saver interface;

a determination unit configured to determine a dynamic interaction effect for the screen saver content based on the target interaction information; and a second display unit configured to display the dynamic interaction effect for the screen saver content on the screen saver interface to realize dynamic interaction between the interaction object and the screen saver content.

In an embodiment, the obtaining unit includes:

an obtaining subunit, configured to obtain a plurality of video frames upon receiving the interaction trigger instruction;

an analyzing subunit, configured to analyze each video frame to obtain, in each video frame, interaction information of the interaction object for the screen saver content; and an information fusion processing subunit, configured to performing information fusion processing on the interaction information corresponding to respective video frames to obtain the target interaction information.

In an embodiment, the analyzing subunit includes:

a feature extraction module, configured to perform feature extraction on a current one of the video frames to obtain feature information of the current one of the video frames;

a determination module, configured to determine an interaction body part of the interaction object in the video frames based on the feature information; and a generation module, configured to generate interaction information based on the interaction body part.

In an embodiment, the information fusion subunit includes:

a comparison processing module, configured to perform comparison processing on the position information corresponding to respective ones of the video frames to obtain the target interaction direction information; and a logic operation processing module, configured to perform logical operation processing on the position information corresponding to respective ones of the video frames and video frame rates to obtain the target interaction speed information.

In an embodiment, the determination unit includes:

a direction adaptation subunit configured to adapt the target interaction direction information to the screen saver content to obtain a change direction of the screen saver content;

a speed adaptation subunit configured to adapt the target interaction speed information to the screen saver content to obtain a change speed of the screen saver content; and a determination subunit configured to determine the dynamic interaction effect for the screen saver content based on the change direction and the change speed.

In an embodiment, the second display unit includes:

a force information generating subunit configured to generate force information to act on the screen saver content based on the dynamic change direction;

an acceleration information generating subunit configured to generate acceleration information to act on the screen saver content based on the dynamic change speed; and an adding subunit configured to add the acceleration information and the force information to the screen saver content, so that the dynamic interaction effect of the screen saver content changing based on the dynamic change direction and the dynamic change speed is displayed on the screen saver interface.

In an embodiment, the second display unit includes:

a noise information generating subunit configured to generate noise information to act on the screen saver content based on the dynamic change speed;

an adding subunit configured to add the noise information to the screen saver content so that the dynamic interaction effect of the screen saver content disorderly changing based on the dynamic change speed is displayed on the screen saver interface.

Accordingly, an embodiment of the present application further provides an electronic device including a memory and a processor. The memory stores a computer program, and the processor is configured to run the computer program in the memory to perform the screen saver interaction method according to any one of the embodiments of the present application.

Accordingly, an embodiment of the present application further provides a storage medium storing a computer program executable by a processor to implement the screen saver interaction method according to any one of the embodiments of the present application.

BENEFICIAL EFFECT OF THE INVENTION

Beneficial Effect

In an embodiment of the present application, a screen saver interface is displayed. Upon receiving the interaction trigger instruction from the interaction object for the screen saver content in the screen saver interface, target interaction information is obtained based on the interaction trigger instruction. A dynamic interaction effect for the screen saver content is determined based on the target interaction information. The dynamic interaction effect for the screen saver content is displayed on the screen saver interface to realize dynamic interaction between the interaction object and the screen saver content.

BRIEF DESCRIPTION OF THE DRAWINGS

Drawings Description

In order that technical solutions in embodiments of the present application may be explained more clearly, reference will now be made briefly to the accompanying drawings required for the description of the embodiments. It will be apparent that the accompanying drawings in the following description are merely some of the embodiments of the present application, and other drawings may be made to those skilled in the art without involving any inventive effort.

DETAILED DESCRIPTION

Detailed Description of the Invention

Technical solutions in embodiments of the present application will be clearly and completely described below in connection with the accompanying drawings in the embodiments of the present application. However, the described embodiments are merely a part of the embodiments of the present application, rather than all the embodiments. Based on the embodiments in the present application, all other embodiments obtained by a person skilled in the art without involving any inventive effort are within the scope of the present application.

An Embodiment of the present application provide a screen saver interaction method that may be executed by a screen saver interaction apparatus that may be integrated in an electronic device having a screen saver function. The electronic device may include at least one of a terminal, a server, or the like. That is, the screen saver interaction method may be executed by a terminal or may be executed by a server.

The terminal may include a smart television, a smartphone, a smart home, a wearable electronic device, an VR/AR device, an in-vehicle computer, or the like.

The server may be an interworking server among a plurality of heterogeneous systems or a background server of a product verification test system, may be an independent physical server, or may be a server cluster or a distributed system formed by a plurality of physical servers, or may be a cloud server that provides basic cloud computing services such as a cloud service, a cloud database, a cloud computing, a cloud function, a cloud storage, a network service, a cloud communication, a middleware service, a domain name service, a security service, a large data, an artificial intelligence platform, or the like.

Figure 1:
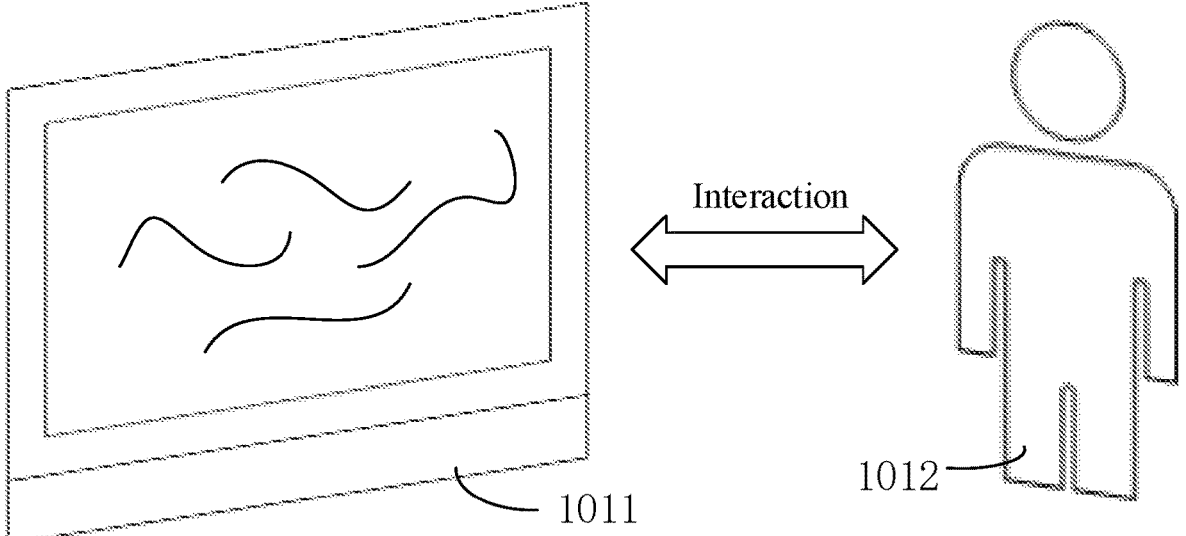
FIG. 1 is a schematic diagram of a scene for a screen saver interaction method according to an embodiment of the present application.

In an embodiment, as shown in FIG. 1, the screen saver interaction apparatus may be integrated in an electronic device such as a terminal or a server to implement the screen saver interaction method according to an embodiment of the present application. Specifically, the electronic device 1011 may display a screen saver interface; upon receiving an interaction trigger instruction from an interaction object 1012 for screen saver content in the screen saver interface, obtain target interaction information based on the interaction trigger instruction; determine a dynamic interaction effect corresponding to the screen saver content based on the target interaction information; and display the dynamic interaction effect for the screen saver content on the screen saver interface to realize dynamic interaction between the interaction object 1011 and the screen saver content.

In the following detailed description, it is to be noted that the order in which the following embodiments are described is not intended to limit the preferred order of the embodiments.

Embodiments of the present application will be described from the perspective of a screen saver interaction apparatus that may be integrated in an electronic device that may include a device having a screen saver function such as a television.

Figure 2:
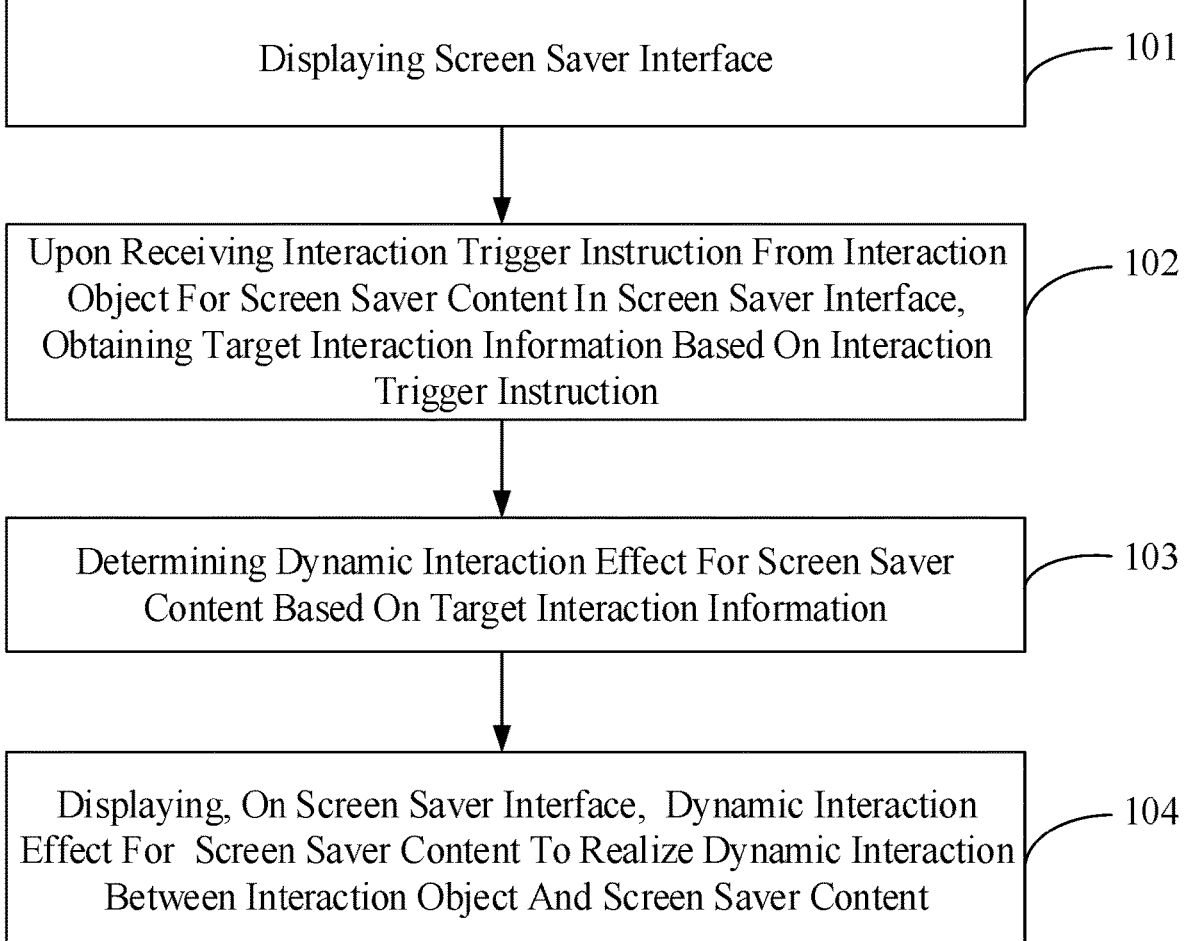
FIG. 2 is a schematic flowchart of a screen saver interaction method according to an embodiment of the present application.

As shown in FIG. 2, a screen saver interaction method is provided, and the screen saver interaction method includes the following steps:

At Step 101, a screen saver interface is displayed.

The screen saver interface includes an interface of the electronic device for displaying screen saver content. For example, the screen saver interface may include an interface of a television for displaying the screen saver content, etc.

The screen saver content includes content displayed on the screen saver interface.

For example, when a movie poster is displayed on the screen saver interface, the screen saver content of the screen saver interface is a movie poster.

For another example, When the screen saver interface is full of lines flying across the screen, the screen saver content of the screen saver interface is the lines flying across the screen.

For another example, when a starry background is displayed on the screen saver interface, the screen saver content of the screen saver interface is the starry background.

In an embodiment, the screen saver content includes content having a dynamic effect.

The screen saver content having a dynamic effect may include content in the screen saver changing dynamically.

For example, when the screen saver content is a movie poster, the movie poster is constantly changing dynamically. For example, the position of the movie poster constantly changes, and thus the screen saver content has the dynamic effect.

For another example, when the screen saver content is full of lines flying across the screen, the screen saver content has a dynamic effect because the lines has a dynamic change of flying across the screen.

For another example, when the screen saver content is a starry background, and the starry background has a changing effect, the screen saver content has a dynamic effect.

In an embodiment, the screen saver content may further include content having a static effect.

The screen saver content having the static effect may include static content in the screen saver.

For example, the screen saver content may include a single picture or a plurality of pictures that are stationary, etc.

In an embodiment, the screen saver content displayed on the screen saver interface may be drawn in advance before the screen saver interface is displayed. For example, the screen saver content may be drawn in advance by using an image view (ImageView). For another example, the screen saver content may be drawn in advance by using an Android Canvas. For another example, the screen saver content may be drawn in advance by using the Processing library.

The Android Canvas is a drawing method. That is, on the Android operating system, by means of the 2D drawing framework Canvas, provided is a method of drawing on the bottom bitmap.

Here, Processing is an open source language created specifically for electronic art and visual interactive design, the purpose of which is to assist in the teaching of programming by means of visualization and to express digital creativity on this basis.

In an embodiment, when the electronic device is in a turn-on state and the electronic device is not in use for a long time, the electronic device may display the screen saver interface. The content in the screen saver interface may be screen saver content having a dynamic effect. For example, when the television is turned-on and no television program is played, the electronic device may display the screen saver interface, the screen saver interface may display screen saver content having a dynamic effect.

At Step 102, upon receiving the interaction trigger instruction from the interaction object for the screen saver content in the screen saver interface, target interaction information is obtained based on the interaction trigger instruction.

The target interaction information includes information that may represent the interaction behavior of the interaction object. For example, the target interaction information may include at least one of target interaction direction information, target interaction speed information, target interaction location information, target interaction distance information, or the like.

The target interaction direction information includes information on changes in the direction of the interaction behavior. For example, when the interaction object interacts with the screen saver content through her/his hand, the target interaction direction information may include a change in the direction of the hand of the interaction object. For another example, when the interaction object interacts with the screen saver content through her/his face, the target interaction direction information may include a change in the direction of the face of the interaction object, the present application is not limited herein. For example, the target interaction direction information may indicate whether the hand of the interaction object changes from east to west, or changes from west to east, or the like.

The target interaction speed information may include information on changes in the speed of the interaction behavior. For example, when the interaction object interacts with the screen saver content through her/his hand, the target interaction speed information may include a change in the speed of the hand of the interaction object. For another example, when the interaction object interacts with the screen saver content through her/his face, the target interaction speed information may include a change in the speed of the face of the interaction object, or the like.

The target interaction position information may include information on a position in the screen saver content which position information of an interaction body part of the interaction object in the video frame is mapped to.

The target interaction distance information may include a distance between the interaction object and the screen saver interface when the interaction object and the screen saver interface interact. For example, when the distance between the interaction object and the screen saver interface is 1 meter, the target interaction information is 1 meter. For another example, when the distance between the interaction object and the screen saver interface is 50 cm, the target interaction information is 0.5 m.

In an embodiment, the electronic device according to an embodiment of the present application may have a sensing function. For example, when the electronic device is a television, the television may have an infrared sensing module. When the television displays the screen saver interface and senses through the infrared sensing module that the interaction object is ready to interact with the screen saver content, the television receives an interaction instruction. For example, when the infrared sensing module senses that there is an interaction object in front of the television, the television receives an interaction trigger instruction.

In an embodiment, the electronic device according to an embodiment of the present application may further have a shooting function. For example, when the electronic device is a television, the television may be externally connected to a shooting apparatus. Alternatively, the television may be embedded with a shooting apparatus. For example, the television may be externally connected to a camera, or may be embedded with a camera, etc.

In the case that the electronic device has a shooting function, when the electronic device receives the interaction trigger instruction, the electronic device may shoot the interaction behavior of the interaction object through the camera, thereby realizing dynamic interaction with the interaction object.

The interaction object includes an object that can interact with the screen saver content in the screen saver interface. For example, the interaction object may include a human or animal, etc.

The interaction behavior includes a behavior by which the interaction object may interact with the screen saver content.

For example, when the electronic device is a television, the interaction behavior may be an operation in which the interaction object interacts with the screen saver content on the television by her/his hand. For another example, the interaction behavior may be an operation in which the interaction object interacts with the screen saver content on the television with her/his face. For another example, the interaction behavior may be an operation in which the interaction object interacts with the screen saver content with both her/his face and her/his hand, etc.

For example, when the interaction object interacts with the screen saver content on the television through her/his hand, the interaction behavior may include a behavior of continually changing positions of the interaction object hand relative to the television. For another example, the interaction behavior may also include a behavior of continually changing the gesture of the hand of the interaction object, etc.

As another example, when the interaction object interacts with the screen saver content on the television through her/his face, the interaction behavior may include continual changes in the position of the face of the interaction object. For another example, the interaction behavior may include changes in the distance between the face of the interaction object and the television, etc.

For another example, when the interaction object interacts with the screen saver content on the television through her/his face and her/his hand, the interaction behavior may include changes in the face and the hand of the interaction object, or the like.

As another example, when the interaction object interacts with the screen saver content on the television by changing the distance therebetween, the interaction behavior may include a change in the distance between the interaction object and the screen saver content on the television.

In an embodiment, when the television includes both the infrared sensing module and the shooting apparatus, if the infrared sensing module detects an interaction object intended to interact with the screen saver content, the infrared sensing module generates the interaction trigger instruction and sends the interaction trigger instruction to the screen saver interaction apparatus. At this time, the screen saver interaction device may enable the shooting apparatus and shoot the interaction behavior of the interaction object by the shooting apparatus.

For example, when the television screen displays a screen saver interface, if the infrared sensing module detects that the interaction object is standing in front of the television screen, an interaction trigger instruction is generated, and the interaction trigger instruction is sent to the screen saver interaction apparatus.

In an embodiment, when the electronic device includes the shooting apparatus, the interaction object may be detected directly by the shooting apparatus, and when it is detected that the interaction object wants to interact with the screen saver content, the interaction trigger instruction may be generated.

When the camera is externally connected to the television through a data line or the like, the camera generates an interaction trigger instruction and transmits the interaction trigger instruction to the television. In this case, the television receives the interaction trigger instruction, and obtains target interaction information according to the interaction trigger instruction.

When the camera is embedded in the television, if the camera captures an interaction of an interaction object with the screen saver content, the screen saver interaction apparatus of the television directly receives an interaction trigger instruction, and obtains target interaction information according to the interaction trigger instruction.

In an embodiment, when the interaction trigger instruction is received, the shooting apparatus continuously shoots the interaction behavior of the interaction object for the screen saver content, and transmits a video frame including the interaction behavior to the screen saver interaction apparatus of the electronic device so that the screen saver interaction apparatus obtains the target interaction information according to the video frame. Specifically, the step of obtaining target interaction information based on the interaction trigger instruction upon receiving the interaction trigger instruction for the screen saver content in the screen saver interface may include:

obtaining a plurality of video frames upon receiving the interaction trigger instruction;

analyzing each video frame to obtain, in each video frame, interaction information of the interaction object for the screen saver content; and performing information fusion processing on the interaction information corresponding to respective video frames to obtain the target interaction information.

By analyzing each video frame, the interaction information of the interaction object for the screen saver content in each video frame is obtained, and information fusion processing is performed on the interaction information corresponding to each video frame to obtain the target interaction information, so that the accuracy of obtaining the target interaction information may be improved.

The interaction information may include information of the interaction body part used when the interaction object performs the interaction behavior in each video frame. For example, the interaction information may include, in each video frame, the location information of the interaction body part used when the interaction object performs the interaction behavior, or the like. As another example, since the interaction object may interact with the screen saver content by changing the distance between the interaction object and the screen saver interface, the interaction information may include the size of the area of the video frame occupied by the interaction object in each video frame. For example, when the distance between the interaction object and the screen saver interface is relatively closer, the area of the video frame occupied by the interaction object is relatively larger. For another example, when the distance between the interaction object and the screen saver interface is relatively far, the area of the video frame occupied by the interaction object is relatively less. The interaction body part may include at least one of a hand or a face of an interaction object.

In an embodiment, when the screen saver interaction device receives the interaction trigger instruction, a plurality of video frames obtained by the shooting apparatus are obtained, and an interaction behavior of the interaction object for the screen saver content is included in the plurality of video frames.

Here, there may be a data callback interface between the electronic device and the shooting apparatus, through which the video frames captured by the shooting apparatus may be transmitted to the screen saver interaction apparatus.

Then, the screen saver interaction device may analyze each video frame to obtain interaction information of the interaction object for the screen saver content in each video frame.

When the video frame is analyzed, the video frame may be analyzed in a plurality of ways.

For example, video frames may be analyzed by using various neural network models having an image analyzing function, such as convolutional neural networks (CNN), de-convolutional networks (DN), deep convolutional inverse graphics networks (DCIGN), region-based convolutional networks (RCNN), faster region-based convolutional networks (Faster RCNN), or the like.

For another example, a video frame may also be analyzed by using an open source computer vision library (openCV). Here, openCV is a cross-platform computer vision and machine learning software library that may run on multiple operating systems while providing interfaces for multiple programming languages, and implement many general algorithms for image processing and computer vision orientation.

In an embodiment, when the openCV is used to analyze the video frame, the openCV may be trained and set in advance so that the openCV may parse the video frame correctly. For example, when it is necessary to obtain the interaction information of the hand and the face of the interaction object to analyze the video frame, the classifier in the initial openCV for the hand and the face of the interaction object may be initialized so that the openCV may correctly recognize the interaction information of the hand and the interaction information of the face of the interaction object.

In an embodiment, the video frame may need to be format converted before being analyzed with openCV.

For example, the openCV may analyze only the image in the Red Green Blue (RGB) format. When the video frame is in the luminance chrominance (YUN) format, it is necessary to perform format conversion on the obtained video frame.

YUV is a color encoding method. It is often used in various image processing components. YUV allows the bandwidth of chromaticity to be reduced in view of human perceptibility when encoding photographs or videos. YUV is a kind of compiled true-color color space, and proprietary terms such as Y' UV, YUV, YCbCr, YPbPr, or the like may all be referred to as YUV, overlapping each other. "Y" represents luminance (Luminance, Luma), and "U" and "V" represents chrominance and chroma.

In an embodiment, when the plurality of video frames are analyzed by the openCV, the plurality of video frames may be feature extracted by the openCV to obtain feature information of the video frame, and the interaction information of the interaction object for the screen saver content is generated according to the feature information. Specifically, the step of analyzing each video frame to obtain interaction information of the interaction object for the screen saver content in each video frame may include:

performing feature extraction on a current video frame to obtain feature information of the current video frame;

determining an interaction body part of an interaction object in a video frame based on the feature information; and generating interaction information according to the interaction body part.

In an embodiment, for an electronic device, a video frame is an image, and the image is formed by pixels, and each pixel is composed of color data. Thus, for an electronic device, an image is a stack of data. Therefore, when the feature extraction is performed on the current video frame, the feature extraction is performed on the data used for the video frame.

The openCV includes herein a plurality of feature extraction methods. For example, the feature information of the video frame may be obtained by performing feature extraction on the video frame by means of convolution, weighting, averaging, or the like.

In an embodiment, after the feature information of the current video frame is obtained, the interaction body part of the interaction object may be determined in the video frame by using the openCV according to the feature information. Here, since the openCV is trained and set before the openCV is used, the openCV may determine the interaction body part of the interaction object in the video frame according to the "experience" obtained at the time of training and setting.

For example, the feature information of the interaction body part obtained by the openCV from the "experience" obtained at the time of training and setting is within a certain threshold range. Therefore, when the openCV obtains the feature information in the current video frame, the openCV compares the feature information in the current video frame with a preset threshold value, to determine the interaction body part of the interaction object in the video frame, and so on.

In an embodiment, after the interaction body part of the interaction object is determined in the video frame, interaction information may be generated based on the interaction body part.

The interaction information may include, in each video frame, information of an interaction body part of the interaction object used to perform the interaction behavior. For example, the interaction information may include, in each video frame, the location information of an interaction body part of the interaction object used to perform the interaction behavior, or the like.

For example, when the interaction object interacts with the interaction content through her/his hand, the interaction information may include position information of the hand of the interaction object in the video frame. As another example, when the interaction object interacts with the interaction content through her/his face, the interaction information may include position information of the face of the interaction object in the video frame.

Figure 3:
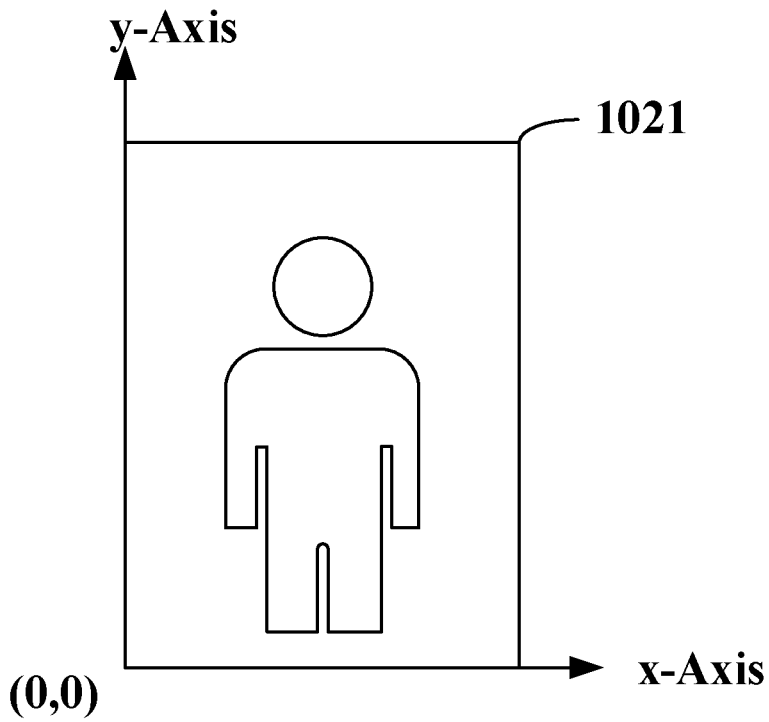
FIG. 3 is a schematic diagram of position information according to an embodiment of the present application.

The position information may be expressed in a plurality of ways. For example, a coordinate axis having a preset coordinate value may be established for each video frame, and the position information may include information of the interaction body part in the coordinate axis. For example, as shown in FIG. 3, a coordinate axis having a preset coordinate value may be established with the lower left corner of the video frame 1021 as a coordinate origin, so that the position information of the interaction body part is represented by the preset coordinate value.

In an embodiment, in order to conveniently represent the position information of the interaction body part, when the interaction body part of the interaction object is determined in the video frame, an appropriate quadrilateral is generated within an area covering the interaction body part, and the position information of the quadrilateral is used as the position information of the interaction body part.

Figure 4:
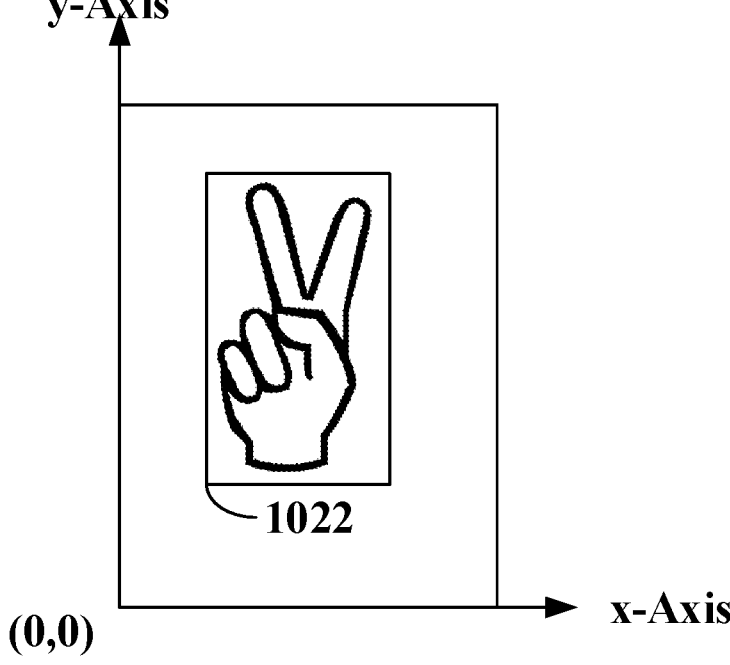
FIG. 4 is a schematic diagram of position information according to another embodiment of the present application.

For example, as shown in FIG. 4, when the interactive portion is a hand of the interaction object, a rectangle 1022 that exactly covers the hand may be generated in the video frame, and the position information of the rectangle is used as the position information of the hand.

Figure 5:
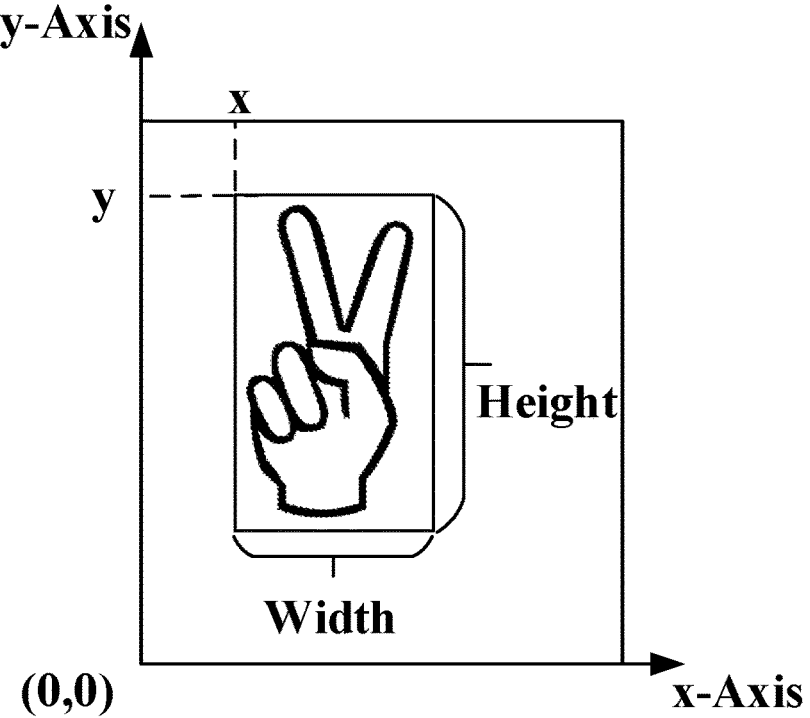
FIG. 5 is a schematic diagram of position information according to yet another embodiment of the present application.

Here, when the position information of the rectangle is used as the position information of the hand, the position information of the rectangle may be represented as a rectangle (Rect) object. Here, the Rect object may include four parameters, which are x, y, width, and height. Where x may represent an abscissa of an upper left corner of the rectangle, y may represent an ordinate of the upper left corner of the rectangle, width may represent the width of the rectangle, and height may represent the height of the rectangle, for example, as shown in FIG. 5.

Figure 6:
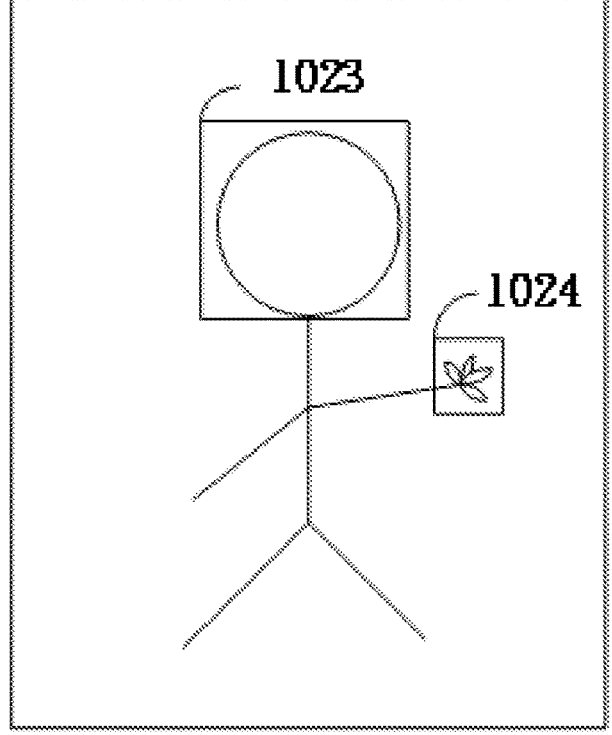
FIG. 6 is a schematic diagram of location information according to yet another embodiment of the present application.

In an embodiment, when the interaction object interacts with the screen saver content at the same time by using a plurality of interaction body parts of the interaction object, Rect objects may be generated respectively for the interaction body parts of the interaction object, to obtain position information of each of the interaction body parts. For example, when the interaction object interacts with the screen saver content by using both the hand and face of the interaction object, Rect objects may be generated respectively for the hand and the face of the interaction object, to obtain the position information of the hand and the position information of the face of the interaction object. For example, as shown in FIG. 6, when the interaction object interacts with the screen saver content by using both the hand and the face of the interaction object, Rect objects (e.g., 1023 and 1024) may be generated respectively for the hand and the face of the interaction object, respectively, to obtain the position information of the hand and the position information of the face of the interaction object.

In an embodiment, when information fusion is performed on the interaction information corresponding to respective video frames to obtain the target interaction information, the target interaction information may be obtained according to the position information of the interaction object obtained when the interaction object interacts with the screen saver content. Specifically, when the target interaction information includes the target interaction direction information and the target interaction speed information, the step of performing information fusion processing on the interaction information corresponding to respective video frames to obtain the target interaction information may include:

performing comparison processing on the position information corresponding to respective video frames to obtain the target interaction direction information; and performing logical operation processing on the position information corresponding to respective video frames and video frame rates to obtain the target interaction speed information.

In an embodiment, when the Rect object is used to represent the position information of the interaction body part in each video frame, the position information of the interaction body part in the current video frame may be compared with the position information of the interaction body part in the next video frame, and the difference between the position information of the current video frame and the position information of the next video frame may be calculated, so that change in the direction of the interaction body part in the next frame relative to the interaction body part in the current video frame may be determined. By comparing the position information of two adjacent frames in the plurality of video frames and calculating the difference value thereof, the change in the direction of the interaction body part is determined, and the target interaction direction information is obtained.

In an embodiment, logical operation processing is performed on the position information corresponding to respective video frames and video frame rates, to obtain the target interaction speed information.

When logical operation processing is performed on the position information corresponding to respective video frames and video frame rates, the position information corresponding to respective video frames and the preset video frame rate may be performed logical operations such as adding, subtracting, multiplying, dividing, and/or the like in accordance to the preset operation logic, to obtain the target interaction speed information.

For example, the position information of two adjacent frames in a plurality of video frames and the preset video frame may be sequentially subjected to logical operations such as adding, subtracting, multiplying, dividing, and/or the like in accordance to the preset operation logic, so as to determine the change speed of the interaction body part and to obtain the target interaction speed information.

Note that the above two steps are not performed sequentially. The step of performing comparison processing on the position information corresponding to respective video frames to obtain the target interaction direction information may be performed before the step of performing logical operation processing on the position information corresponding to respective video frames and video frame rates to obtain the target interaction speed information. Alternatively, the step of performing logical operation processing on the position information corresponding to respective video frames and video frame rates to obtain the target interaction speed information may be performed before the step of performing comparison processing on the position information corresponding to respective video frames to obtain the target interaction direction information.

In an embodiment, when the target interaction information includes the target interaction location information, the step of performing information fusion processing on the interaction information corresponding to respective video frames to obtain the target interaction information may include:

mapping the position information corresponding to each video frame to the screen saver content, to obtain target interaction position information.

For example, the position information corresponding to each video frame may be mapped to a corresponding position in the screen saver content to obtain the target interaction position information.

At Step 103, a dynamic interaction effect for the screen saver content is determined based on the target interaction information.

The dynamic interaction effect includes an effect that makes the screen saver content to dynamically change according to the target interaction information. For example, the dynamic interaction effect may include at least one of a dynamic change direction and a dynamic change speed of the screen saver content, or the like. Here, there may be different dynamic interaction effects depending on different screen saver contents.

For example, when the screen saver content on the television is a single picture, the dynamic interaction effect may include an effect where the picture changes continuously as the interaction body part of the interaction object moves.

For another example, when the screen saver content on the television is a plurality of pictures, the dynamic interaction effect may include an effect of continuously switching the objects according to the moving speed of the interaction body part of the interaction object.

For another example, when the screen saver content on the television is the lines continuously flying across the screen, the dynamic effect may include an effect of changing the direction and speed of the line flying according to the change of the interaction body part of the interaction object.

For another example, when the screen saver content on the television is a starry sky with a black hole in the middle of the starry sky, and all other celestial objects rotate along with the black hole, the dynamic effect may include that when the interaction body part of the interaction object moves, the black hole moves along with it and the surrounding celestial objects move along with the black hole.

For another example, when the screen saver content on the television is a screen saver short video, the dynamic effect may include an effect of playing the screen saver short video according to the distance between the interaction object and the screen saver interface. For example, when the distance between the interaction object and the screen saver interface is relatively closer, the speed of playing the screen saver short video is increased. When the distance between the interaction object and the screen saver interface is relatively father, the speed of playing the screen saver short video is reduced. For another example, when the distance between the interaction object and the screen saver interface is relatively father, the speed of playing the screen saver short video may be increased. When the distance between the interaction object and the screen saver interface is relatively closer, the speed of playing the screen saver short video is reduced. For another example, a progress bar of the screen saver short video may be changed according to a moving direction of the interaction body part of the interaction object. For example, when the interaction object moves to the left with respect to the screen saver interface, the progress bar of the screen saver short video is played back. For another example, when the interaction object moves to the right with respect to the screen saver interface, the progress bar of the screen saver short video is played forward, and so on.

In an embodiment, when the target interaction information includes the target interaction direction information and the target interaction speed information, the target interaction direction information and the target interaction speed information may be adapted to the screen saver content, to determine a dynamic interaction effect corresponding to the screen saver content. Specifically, the step of determining the dynamic interaction effect for the screen saver content according to the target interaction information may include:

adapting the target interaction direction information to the screen saver content to obtain a change direction of the screen saver content;

adapting the target interaction speed information to the screen saver content to obtain a change speed of the screen saver content; and determining the dynamic interaction effect corresponding to the screen saver content according to the change direction and the change speed.

The dynamic interaction effect may refer to more than one of a dynamic change direction and a dynamic change speed of the screen saver content, or may refer to any one of a dynamic change direction and a dynamic change speed of the screen saver content.

For example, the screen saver content on the television is a line constantly flying, and the obtained target interaction direction information is that the hand of the interaction object moves from east to west. The target interaction direction information and the line are adapted to obtain that the change direction of the line is a direction from east to west. In addition, the obtained target interaction speed information is that the hand of the interaction object moves from east to west at a speed of 20 centimeters per second, and the target interaction speed information is adapted to the line to obtain that the change speed of the line is 20 centimeters per second. Then, the dynamic interaction effect of the line may be determined to be changed from east to west at a change speed is 20 cm per second according to the change speed and the change direction.

For another example, the screen saver content on a television is a plurality of linear flying. At this time, two pieces of target interaction information are obtained, one of which is that one hand of the interaction object changes from east to west, and the other hand of the interaction object changes from west to east. Then, by adapting the two pieces of target interaction direction information to the plurality of lines on the screen saver, a part of the plurality of lines may be changed from the west to the east, while the other part of the lines may be changed from the east to the west. In addition, the target interaction speed information of one hand is obtained to be 20 cm per second, while the target interaction speed information of the other hand is obtained to be 30 cm per second. Then, by adapting the two target interaction speed information to the plurality of lines on the screen saver, the change speed of a part of the plurality of lines may be made to be 20 centimeters per second, while the change speed of the other part of the lines is made to be 30 centimeters per second. Then, according to the change speed and the change direction, the dynamic interaction effect of the plurality of lines may be determined: a part of the lines changes from west to east at the change speed of 20 centimeters per second, while the other part of the lines changes from east to west at the change speed of 30 cm per second.

For another example, the screen saver content on the television is a starry sky with a black hole in the middle of the starry sky, and all other celestial objects rotate along with the black hole. At this time, if the obtained target interaction direction information is that the hand of the interaction object moves from east to west, the target interaction direction information and the screen saver content are adapted, to obtain the change direction of the black hole is a direction from east to west. The target interaction speed information of the hand of the interaction object is obtained as 20 centimeters per second, and the target interaction speed information and the screen saver content are adapted so that the speed at which other stars are absorbed by the black hole may be obtained as 20 centimeters per second. Then, according to the change speed and the change direction, it is determined that the dynamic interaction effect for the screen saver content is that the black hole moves from east to west, and that the black hole absorbs other stars at a speed of 20 centimeters per second.

Figure 7:
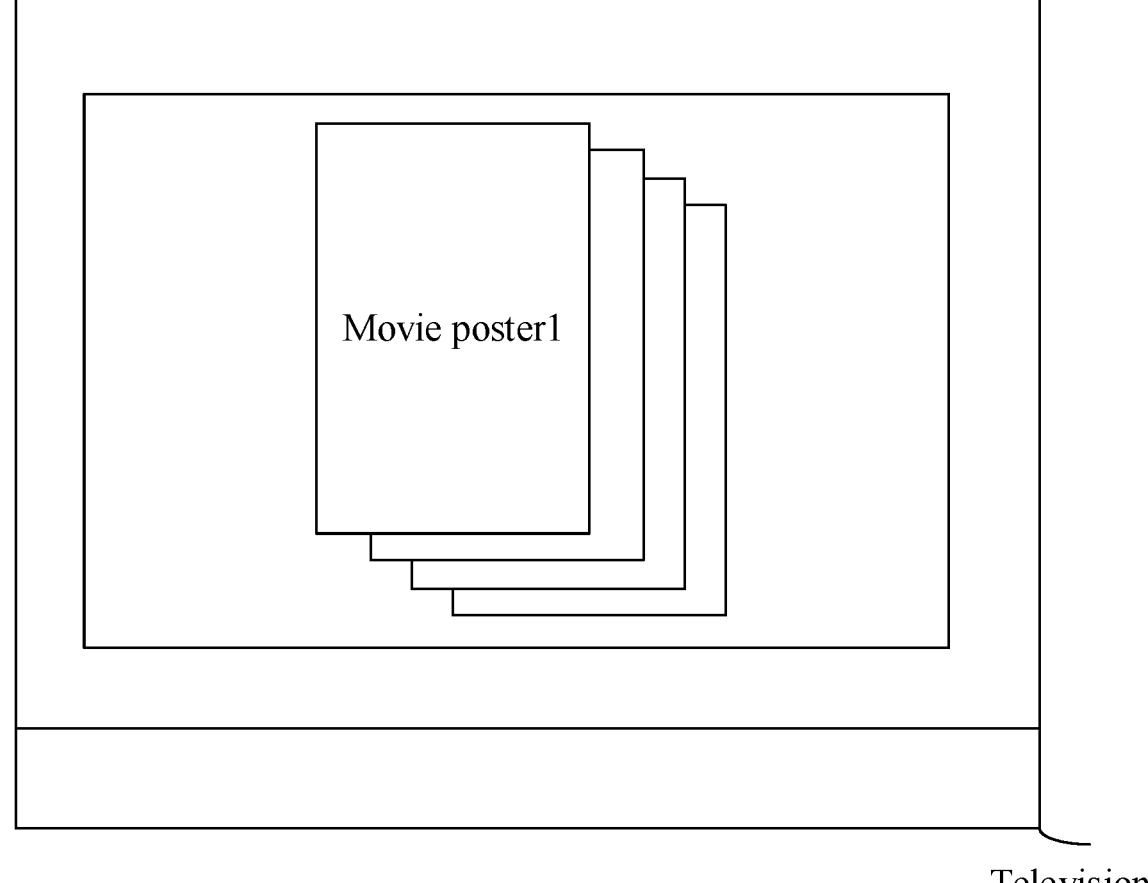
FIG. 7 is a schematic diagram of a scene for screen saver content according to an embodiment of the present application.

For another example, the screen saver content on the television is a plurality of movie posters, and the plurality of movie posters may be switched therebetween, as shown in FIG. 7. The target interaction direction information, the target interaction speed information, and the screen saver content may be adapted to obtain the dynamic interaction effect for the screen saver content. For example, the display content of the movie poster may be switched when the speed of the hand of the interaction object reaches a certain threshold value. Here, when the hand of the interaction object changes up and down, the movie posters are switched up and down, and when the hand of the interaction object changes left and right, the movie poster is switched right and left.

In an embodiment, when the target interaction information includes target interaction location information, the step of determining the dynamic interaction effect for the screen saver content is determined according to the target interaction information may include:

adapting the target interaction position information to the screen saver content to obtain a change speed of the screen saver content; and determining the dynamic interaction effect corresponding to the screen saver content according to the change speed.

For example, the screen saver content on the television includes a plurality of particles moving along a predetermined movement track. When the hand of the interaction object covers a portion of the particles, the covered portion of the particles may move at an increased size of the velocity, but the direction of the velocity is unchanged.

As another example, the screen saver content includes a water ripple effect generated from the center point of the screen saver interface. When the hand of the interaction object covers the central point, a set of outwardly spreading ripple effects may be generated.

It should be noted that the above example is only some examples of dynamic interaction effects. In practical applications, different dynamic interaction effects may be determined according to the screen saver content.

In an embodiment, when the target interaction information includes the target interaction distance information, the step of determining a dynamic interaction effect for the screen saver content is determined according to the target interaction information may include:

adapting the target interaction distance information to the screen saver content to obtain a change speed of the screen saver content; and determining the dynamic interaction effect corresponding to the screen saver content according to the change speed.

For example, when the screen saver content is a screen saver short video, the play speed of the screen saver short video may vary depending on the distance between the interaction object and the screen saver interface.

At Step 104, the dynamic interaction effect for the screen saver content is displayed on the screen saver interface to realize dynamic interaction between the interaction object and the screen saver content.

In an embodiment, after determining the dynamic interaction effect corresponding to the screen saver content, the dynamic interaction effect for the screen saver content may be displayed on the screen saver interface.

When the dynamic interaction effect includes the dynamic change direction and the dynamic change speed of the screen saver content, the step of displaying the dynamic interaction effect for the screen saver content on the screen saver interface may include:

generating force information to act on the screen saver content according to the dynamic change direction;

generating acceleration information to act on the screen saver content based on the dynamic change speed; and adding the acceleration information and the force information to the screen saver content, so that the dynamic interaction effect of the screen saver content changing according to the dynamic change direction and the dynamic change speed is displayed on the screen saver interface.

The acceleration information includes information that may change the moving speed of the screen saver content. For example, when the screen saver content is a line flying at a certain speed, the acceleration information may be information that changes the moving speed of the line.

The force information includes information that changes the moving direction of the screen saver content. For example, when the screen saver content is a fish moving from east to west, the force information may be information that changing the moving direction of the fish from east to southwest.

In an embodiment, the force information to act on the screen saver content may be generated based on the dynamic change direction. For example, an angle for direction change may be generated based on the dynamic change direction, and the angle may be used as the force information.

Figure 8:
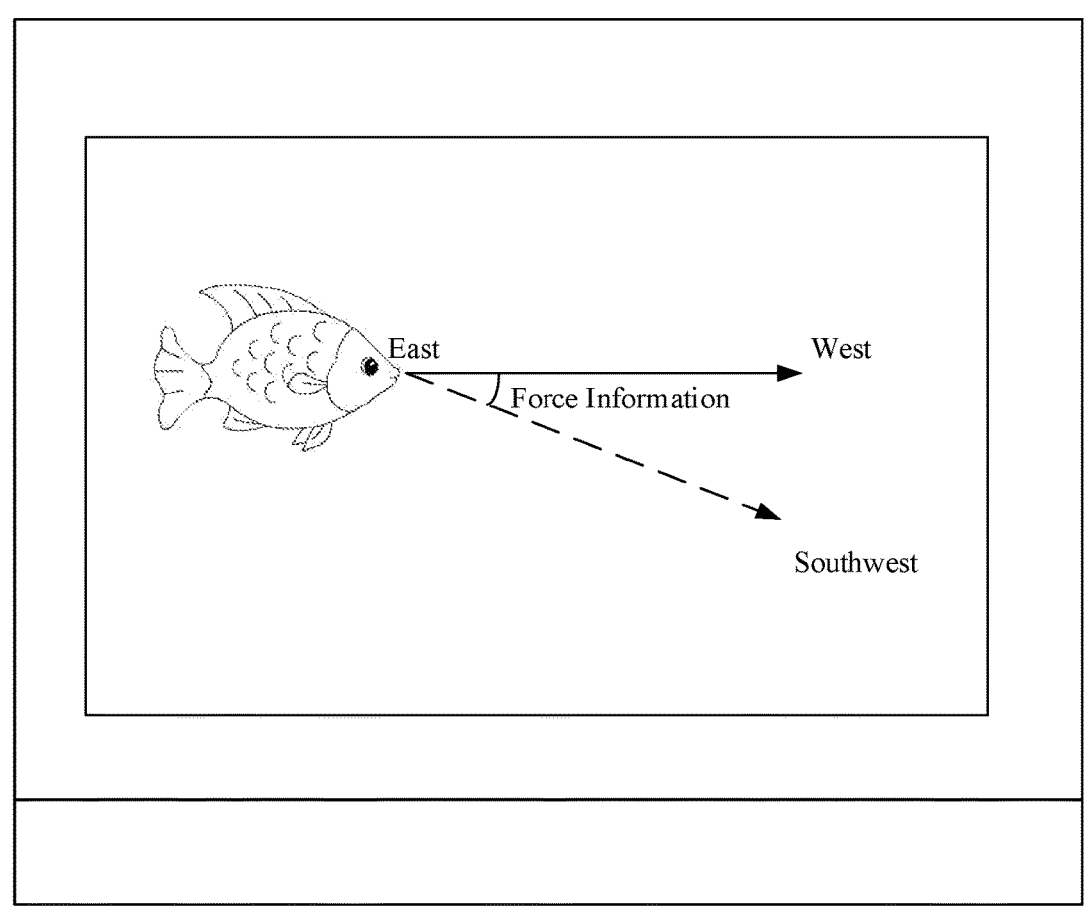
FIG. 8 is a schematic diagram of a scene for screen saver content according to another embodiment of the present application.

For example, as shown in FIG. 8, the current screen saver content is a fish moving from east to west. The dynamic change direction is to make the fish move from east to southwest. At this time, when the direction of the original movement of the fish and the direction of the changed movement of the fish may form an angle difference, the force information may be generated based on the angle difference.

In an embodiment, the acceleration information applied to the screen saver content may be generated based on the dynamic change speed. For example, the current screen saver content is a fish. The original moving speed and dynamic change speed of the fish may be logically calculated to obtain the acceleration information.

In an embodiment, after the acceleration information and the force information are obtained, the acceleration information and the force information may be added to the screen content to display a dynamic interaction effect of the screen content on the screen interface according to the dynamic change speed and the dynamic change direction.

For example, when the screen saver content is generated by drawing by using the Processing library, a plurality of generation information obtained when generating the screen saver content may exist in the Processing library. For example, information for controlling the dynamic interaction effect for the screen saver content exists in the Processing library.

For example, when the screen saver content is a fish swimming, the Processing library may include speed information and direction information for controlling the fish swimming. In this case, the force information may be added to the direction information, and the acceleration information may be added to the speed information, so that the fish may has a change in its swimming according to the dynamic change speed and the dynamic change direction. In an embodiment, when the dynamic interaction effect includes a dynamic change speed, the noise information to act on the screen saver content may be generated according to the dynamic change speed, and the noise information may be added to the screen saver content. Specifically, the step of displaying the dynamic interaction effect for the screen saver content on the screen saver interface may include:

generating noise information to act on the screen saver content according to the dynamic change speed; and adding the noise information to the screen saver content so that the dynamic interaction effect of the screen saver content disorderly changing according to the dynamic change speed is displayed on the screen saver interface.

The noise information may be information that causes the screen saver content to disorderly move. For example, the noise information may be a Perlin noise, by adding the Perlin noise to the screen saver content, so that the screen saver content may has a dynamic interaction effect of disorder changing.

In an embodiment, the noise information applied to the screen saver content may be generated according to the dynamic change speed. For example, the dynamic change speed may be matched with a preset mapping table including a mapping relationship between the dynamic change speed and the noise information. For example, when the dynamic change speed is greater, greater noise information may be generated, thereby making the disorder changing of the screen saver content more violent. When the dynamic change speed is small, a smaller noise information may be generated, so that the amplitude of the disorder changing of the screen saver content is less.

By matching the dynamic change speed with the preset mapping table, the size of the noise information may be determined, and the corresponding noise information may be generated. For example, when the noise information is the Perlin noise, the Perlin noise may be generated by using a Berlin noise generation algorithm or a Berlin noise generation function.

In an embodiment, after the noise information is generated, the noise information may be added to the screen saver content to provide, on the screen saver interface, a dynamic interaction effect of disorder changing of the screen saver content.

For example, when the screen saver content is generated by drawing with the Processing library, the Processing library may include information for controlling the screen saver content to disorderly move. In this case, the noise information may be added to the information for controlling the screen saver content to disorderly move, thereby causing the screen saver content to disorderly move.

Figure 9:
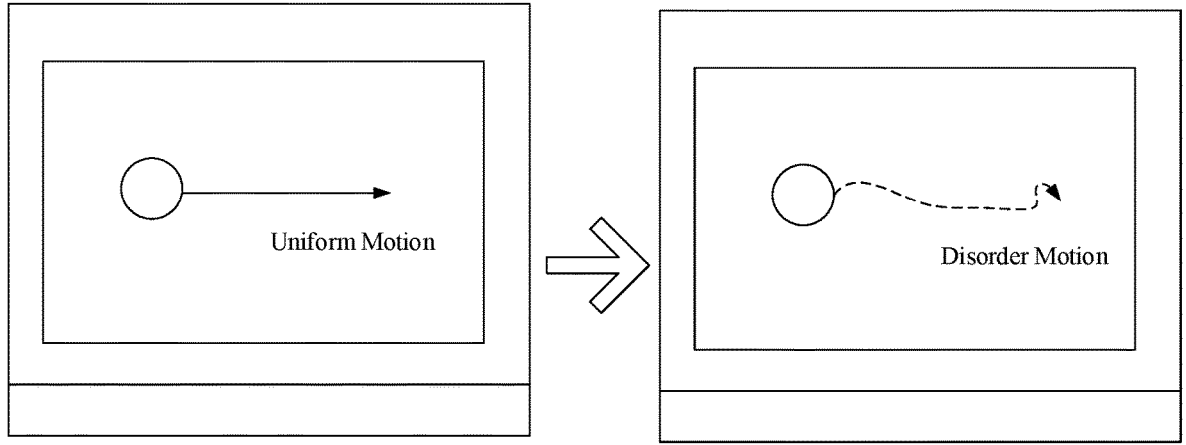
FIG. 9 is a schematic diagram of a scene for screen saver content according to another embodiment of the present application.

For example, as shown in FIG. 9, the screen saver content may include particles moving at an unchanged speed. By adding noise information to the particles, the particles are controlled to disorderly move, to achieve the effect of interacting between the interaction object and the particles in the screen saver content.

For another example, when the screen saver content includes a water ripple effect generated from the center point of the screen saver interface, the noise information may be added to the water ripple, thereby generating a set of outwardly spreading ripple effects.

In an embodiment, when the dynamic interaction effect includes the dynamic interaction direction, the noise information to act on the screen saver content may be generated according to the dynamic change direction, and the noise information is added to the screen saver content, so that the screen saver content is subject to a disorder change. For example, when the screen saver interaction object is closer to the television, a larger noise information may be generated, so that the screen saver content undergoes violent and chaotic movements, and so on.

In an embodiment, the screen saver interaction method according to an embodiment of the present application is described in conjunction with a specific scene, to better implement the screen saver interaction method according to an embodiment of the present application.

In an embodiment, when the screen saver content includes a single picture, the displaying of the dynamic interaction effect of the screen saver content on the screen saver interface may include the displaying of, on the screen saver interface, the dynamic interaction effect of a picture that changes in the corresponding change direction and change speed with the interaction direction and interaction speed of the interaction object.

For example, the screen saver content includes a single picture. The picture moves to the left when the hand of the interaction object moves to the left. When the hand of the interaction object moves to the right, the picture moves to the right. When the hand of the interaction object moves faster, the picture moves faster. Similarly, when the hand of the interaction object moves slowly, the picture moves slowly.

For example, the screen saver content includes a plurality of pictures. When the hand of the interaction object moves to the left, the plurality of pictures move to the left at the same time. When the hand of the interaction object moves to the right, the plurality of pictures move to the right at the same time. When the hand of the interaction object moves faster, the plurality of pictures move faster at the same time. Similarly, when the hand of the interaction object moves slowly, the plurality of pictures move slowly.

In an embodiment, when the screen saver content includes a plurality of images, the displaying of the dynamic interaction effect for the screen saver content on the screen saver interface may include the displaying of a dynamic interaction effect of switching the plurality of pictures in accordance to a corresponding change direction and a change speed, on the screen saver interface according to an interaction direction and an interaction speed of the interaction object.

For example, according to the interaction direction (to the left, to the right) of the human hand, when the magnitude of the speed reaches a certain threshold value, the displayed picture is switched to the previous or the next picture. Alternatively, it is possible to switch the pictures in the horizontal direction and the up-and-down direction instead of only the horizontal direction. When the magnitude of the speed reaches a certain threshold value, the displayed picture is switched by itself according to the moving (up or down) direction of the hand.

In an embodiment, when the screen saver content includes random movement of a preset picture on the screen saver interface, the displaying of the dynamic interaction effect for the screen saver content on the screen saver interface may include the displaying of the dynamic interaction effect on the screen saver interface that a movement speed and a movement direction of the preset picture changes with the interaction direction and the interaction speed of the interaction object. The preset picture may be a picture having a shape of a line, an air bubble, a snowflake, or the like.

For example, when the preset picture has a shape of a line, the line may be changed in the moving direction and the moving speed according to the interactive direction (to the left, to the right, down, or up) and the interactive direction of the human hand.

An embodiment of the present application provides a screen saver interaction method, which may include: displaying a screen saver interface; upon receiving the interaction trigger instruction from the interaction object for the screen saver content in the screen saver interface; obtaining target interaction information based on the interaction trigger instruction; determining a dynamic interaction effect for the screen saver content based on the target interaction information; and displaying the dynamic interaction effect for the screen saver content on the screen saver interface to realize dynamic interaction between the interaction object and the screen saver content.

Furthermore, according to different screen saver contents, the present application may realize different dynamic interaction effects. For example, the screen saver effect is a starry sky with a black hole in the middle, and all other celestial objects rotate along with the black hole. When a human's hand moves, the black hole moves along with it, and the surrounding celestial objects move along with the black hole. For another example, when the screen saver content includes a water ripple effect generated from the center point of the screen saver interface, the noise information may be added to the water ripple, and thus a set of outwardly spreading ripple effects may be generated, etc., thereby improving the richness of the screen saver interaction in the embodiment of the present application.

In order to better implement the screen saver interaction method according to an embodiment of the present application, a screen saver interaction apparatus may be integrated in an electronic device is provided according to an embodiment of the present application. The meaning of a noun is the same as in the method for the above-mentioned product, specific implementation details may be referred to the description of the methods according to the above embodiments of the present application.

Figure 10:
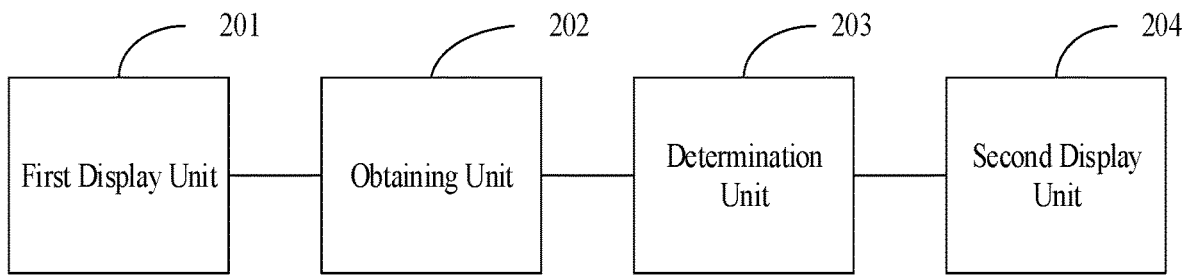
FIG. 10 is a schematic block diagram of a screen saver content interaction apparatus according to an embodiment of the present application.

In an embodiment, there is provided a screen saver interaction apparatus, which may be specifically integrated in an electronic device, such as a television. As shown in FIG. 10, the screen saver interaction apparatus includes a first display unit 201, an obtaining unit 202, a determination unit 203, and a second display unit 204.

The first display unit 201 is configured to display a screen saver interface;

The obtaining unit 202 is configured to obtain target interaction information based on the interaction trigger instruction upon receiving the interaction trigger instruction from an interaction object for screen saver content in the screen saver interface. The target interaction information includes information generated when the interaction object interacts with the screen saver content in the screen saver interface;

The determination unit 203 is configured to determine a dynamic interaction effect corresponding to the screen saver content based on the target interaction information; and The second display unit 204 is configured to display the dynamic interaction effect for the screen saver content on the screen saver interface to realize dynamic interaction between the interaction object and the screen saver content.

In an embodiment, the obtaining unit 202 includes:

an obtaining subunit, configured to obtain a plurality of video frames upon receiving the interaction trigger instruction;

an analyzing subunit, configured to analyze each video frame to obtain, in each video frame, interaction information of the interaction object for the screen saver content; and an information fusion processing subunit, configured to performing information fusion processing on the interaction information corresponding to respective video frames to obtain the target interaction information.

In an embodiment, the determination unit 203 includes:

a direction adaptation subunit configured to adapt the target interaction direction information to the screen saver content to obtain a change direction of the screen saver content;

a speed adaptation subunit configured to adapt the target interaction speed information to the screen saver content to obtain a change speed of the screen saver content; and a determination subunit configured to determine the dynamic interaction effect corresponding to the screen saver content according to the change direction and the change speed.

In an embodiment, the second display unit 204 includes:

a force information generating subunit configured to generate force information to act on the screen saver content according to the dynamic change direction;

an acceleration information generating subunit configured to generate acceleration information to act on the screen saver content based on the dynamic change speed;

an adding subunit configured to add the acceleration information and the force information to the screen saver content, so that the dynamic interaction effect of the screen saver content changing according to the dynamic change direction and the dynamic change speed is displayed on the screen saver interface.

In an embodiment, the second display unit 204 includes:

a noise information generating subunit configured to generate noise information to act on the screen saver content according to the dynamic change speed;

an adding subunit, configured to add the noise information to the screen saver content so that the dynamic interaction effect of the screen saver content disorderly changing according to the dynamic change speed is displayed on the screen saver interface.

In the specific implementation, each of the above units may be implemented as an independent entity, or may be implemented in any combination as the same entity or several entities. For a specific implementation of each of the above units, reference may be made to the description of the methods according to the above embodiments of the present application, and details are not described herein.

The screen saver interaction device may realize dynamic interaction between the interaction object and the screen saver content, thereby improving the richness and interest of the screen saver content.

Figure 11:
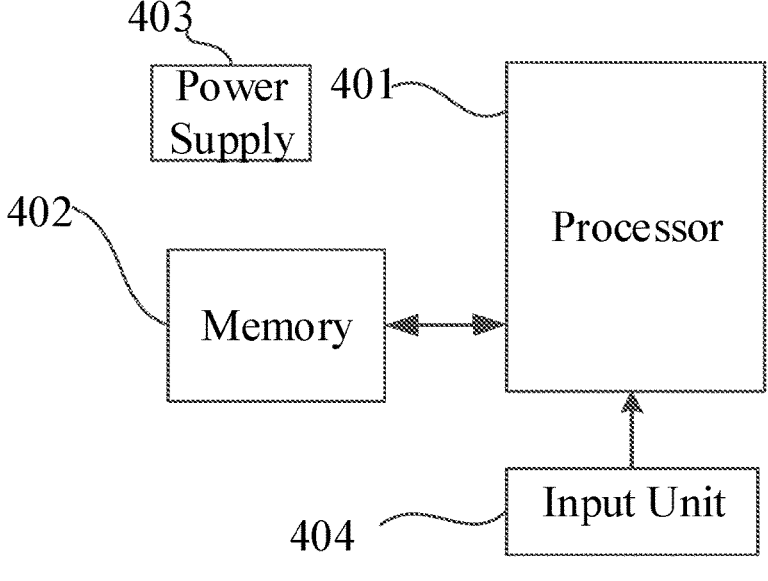
FIG. 11 is a schematic block diagram of an electronic device according to an embodiment of the present application

An embodiment of the present application further provides an electronic device, which may include a terminal or a server. For example, the electronic device may be used as a screen saver interaction terminal, which may include a smart television or the like. For another example, the computer device may include a server, such as a screen saver interaction server, or the like. FIG. 11 shows a schematic block diagram of a terminal according to an embodiment of the present application.

The electronic device may include components such as a processor 401 of one or more processing cores, a memory 402 of one or more computer-readable storage media, a power supply 403, and an input unit 404. It will be appreciated by those skilled in the art that the electronic device structure shown in FIG. 11 is not intended to limit the electronic device, and may include more or less components than illustrated, or may combine certain components, or different component arrangements.

The processor 401 is a control center of the electronic device, connects various parts of the entire electronic device by various interfaces and lines, executes various functions of the electronic device and processes data by running or executing software programs and/or modules stored in the memory 402 and invoking data stored in the memory 402, thereby monitoring the electronic device as a whole. Alternatively, the processor 401 may include one or more processing cores. Alternatively, the processor 401 may integrate an application processor and a modem processor. The application processor mainly processes an operating system, a user page, an application program, or the like, and the modem processor mainly processes wireless communication. It will be appreciated that the modem processor may also not be integrated into the processor 401.

The memory 402 may be used to store software programs and modules, and the processor 401 executes various functional applications and data processing by running the software programs and modules stored in the memory 402. The memory 402 may mainly include a storage program area and a storage data area. The storage program area may store an operating system, an application program (such as a sound play function, an image play function, or the like) required by at least one function, or the like. The storage data area may store data or the like created according to the use of the computer device. In addition, memory 402 may include high speed random access memory, and may further include non-volatile memory, such as at least one magnetic disk storage device, flash memory device, or other volatile solid state storage device. Accordingly, memory 402 may further include a memory controller to provide access to memory 402 by processor 401.

The electronic device further includes a power supply 403 for supplying power to the respective components. Alternatively, the power supply 403 may be logically connected to the processor 401 through a power management system, so that functions such as charging, discharging, and power consumption management are managed through the power management system. The power supply 403 may further include one or more DC or AC power supplies, a recharging system, a power failure detection circuit, a power converter or inverter, a power status indicator, or any other component.

The electronic device may further include an input unit 404 configured to receive input numeric or character information, and to generate keyboard, mouse, joystick, optical or trackball signal input related to the setting set by the user and functional control.

Although not shown, the electronic device may further include a display unit or the like, and details are not described herein. Specifically, in this embodiment, the processor 401 in the electronic device loads the executable files corresponding to the processes of one or more application programs into the memory 402 according to the following instructions, and the processor 401 runs the application programs stored in the memory 402, thereby implementing various operations as follows.

A screen saver interface is displayed.

Upon receiving the interaction trigger instruction from the interaction object for the screen saver content in the screen saver interface, target interaction information is obtained based on the interaction trigger instruction.

A dynamic interaction effect for the screen saver content is determined based on the target interaction information.

The dynamic interaction effect for the screen saver content is displayed on the screen saver interface to realize dynamic interaction between the interaction object and the screen saver content.

Reference may be made to the above embodiments for a specific implementation of each of the above operations, and details are not described herein.

According to one aspect of the present application, there is provided a computer program product or computer program including computer instructions stored in a computer readable storage medium. A processor of a computer device reads the computer instructions from a computer readable storage medium. The processor executes the computer instructions to cause the computer device to perform the methods according to any of the various alternative implementations of the above-described embodiments.

It will be appreciated by those of ordinary skill in the art that all or a portion of the steps of any of the various methods according to the above-described embodiments may be performed by a computer program, which may be stored in a computer-readable storage medium and loaded and executed by a processor, or by a hardware related to computer program controlling.

To this end, an embodiment of the present application further provides a storage medium in which a computer program is stored, which may be loaded by a processor to perform steps in any of the screen saver interaction methods according to the embodiments of the present application. For example, the computer program may perform the following steps:

displaying a screen saver interface;

upon receiving the interaction trigger instruction from the interaction object for the screen saver content in the screen saver interface; obtaining target interaction information based on the interaction trigger instruction;

determining a dynamic interaction effect for the screen saver content based on the target interaction information; and displaying the dynamic interaction effect for the screen saver content on the screen saver interface to realize dynamic interaction between the interaction object and the screen saver content.

For a specific implementation of each of the above operations, reference may be made to the description of the methods according to the above embodiments of the present application, and details are not described herein.

Since the computer program stored in the storage medium may perform the steps in any one of the screen saver interaction methods according to the embodiments of the present application, the advantageous effects that may be achieved in any one of the screen saver interaction methods according to the embodiments of the present application may be realized by the computer program. For details, refer to the foregoing embodiments, and details are not described herein.

The foregoing describes in detail a method and an apparatus of screen saver interaction, an electronic device, and a storage medium according to the embodiments of the present application. The principles and embodiments of the present application are described herein by using specific examples. The description of the above embodiments is merely intended to help understand the method of the present application and its core idea. Meanwhile, variations will occur to those skilled in the art in both the detailed description and the scope of application in accordance with the teachings of the present application. In view of the foregoing, the present description should not be construed as limiting the application.

What is claimed is:

1. A screen saver interaction method, comprising:
displaying a screen saver interface;
obtaining a plurality of video frames upon receiving an interaction trigger instruction;
analyzing each of the video frames to obtain, in each of the video frames, interaction information of an interaction object for screen saver content, wherein the interaction information comprises location information of the interaction object when the interaction object interacts with the screen saver content, the location information comprises information of a location of an interaction body part of the interaction object in each of the video frames, and the target interaction information comprises target interaction direction information and target interaction speed information;
performing comparison processing on the position information corresponding to respective ones of the video frames to obtain the target interaction direction information;
performing logical operation processing on the position information corresponding to respective ones of the video frames and video frame rates to obtain the target interaction speed information;
determining a dynamic interaction effect for the screen saver content based on the target interaction information; and
displaying, on the screen saver interface, the dynamic interaction effect for the screen saver content to realize dynamic interaction between the interaction object and the screen saver content.

2. The screen saver interaction method of claim 1, wherein the analyzing of each of the video frames to obtain the interaction information of the interaction object for the screen saver content in each of the video frames comprises:
performing feature extraction on a current one of the video frames to obtain feature information of the current one of the video frames;
determining an interaction body part of the interaction object in the video frames based on the feature information; and
generating interaction information based on the interaction body part.

3. The screen saver interaction method of claim 1, wherein the step of determining the dynamic interaction effect for the screen saver content based on the target interaction information comprises:
adapting the target interaction direction information to the screen saver content to obtain a change direction of the screen saver content;
adapting the target interaction speed information to the screen saver content to obtain a change speed of the screen saver content; and
determining the dynamic interaction effect for the screen saver content based on the change direction and the change speed.

4. The screen saver interaction method of claim 1, wherein the performing of the comparison processing on the position information corresponding to respective ones of the video frames to obtain the target interaction direction information comprises:
comparing the position information of the interaction body part in a current one of the video frames with the position information of the interaction body part in a next one of the video frames, to obtain a comparison result;
calculating a difference between the position information for the current one of the video frames and the position information for the next one of the video frames, based on the comparison result;
determining a change direction between the interaction body part in the current one of the video frames and the interaction body part in the next one of the video frames based on the difference; and
integrating the change direction to obtain the target interaction direction information.

5. The screen saver interaction method of claim 1, wherein the dynamic interaction effect comprises a dynamic change direction and a dynamic change speed of the screen saver content;
the displaying of the dynamic interaction effect for the screen saver content on the screen saver interface comprises:
generating force information to act on the screen saver content based on the dynamic change direction;
generating acceleration information to act on the screen saver content based on the dynamic change speed; and
adding the acceleration information and the force information to the screen saver content, so that the dynamic interaction effect of the screen saver content changing based on the dynamic change direction and the dynamic change speed is displayed on the screen saver interface.

6. The screen saver interaction method of claim 1, wherein the dynamic interaction effect comprises a dynamic change speed of screen saver content;
the displaying of the dynamic interaction effect for the screen saver content on the screen saver interface comprises:
generating noise information to act on the screen saver content based on the dynamic change speed; and
adding the noise information to the screen saver content so that the dynamic interaction effect of the screen saver content disorderly changing based on the dynamic change speed is displayed on the screen saver interface.

7. The screen saver interaction method of claim 1, wherein the screen saver content comprises a single picture, and the displaying of the dynamic interaction effect for the screen saver content on the screen saver interface comprises:
displaying, on the screen saver interface, a dynamic interaction effect of the picture changing in a corresponding change direction and a corresponding change speed with an interaction direction and an interaction speed of the interaction object.

8. The screen saver interaction method of claim 1, wherein the screen saver content comprises a plurality of pictures, and the displaying of the dynamic interaction effect for the screen saver content on the screen saver interface comprises:

displaying, on the screen saver interface, a dynamic interaction effect of switching the plurality of pictures in accordance to a corresponding change direction and a corresponding change speed based on an interaction direction and an interaction speed of the interaction object.

9. The screen saver interaction method of claim 1, wherein the screen saver content comprises random movement of a preset picture on the screen saver interface, and the displaying of the dynamic interaction effect for the screen saver content on the screen saver interface comprises:

displaying, on the screen saver interface, the dynamic interaction effect in which a movement speed and a movement direction of the preset picture changes with the interaction direction and the interaction speed of the interaction object.

10. The screen saver interaction method of claim 1, wherein the screen saver content comprises content with a static effect and/or content with a dynamic effect.

11. An electronic device comprising a memory and a processor, wherein the memory stores a computer program, and the processor is configured to run the computer program in the memory to perform the screen saver interaction method of claim 1.

12. A non-transitory computer readable storage medium storing a plurality of computer programs loadable by a processor to perform the screen saver interaction method of claim 1.

* * * * *